July 29, 1958 L. SHAPIRO 2,845,574
ADJUSTABLE LINEAR AMPLIFIER
Filed Dec. 31, 1954
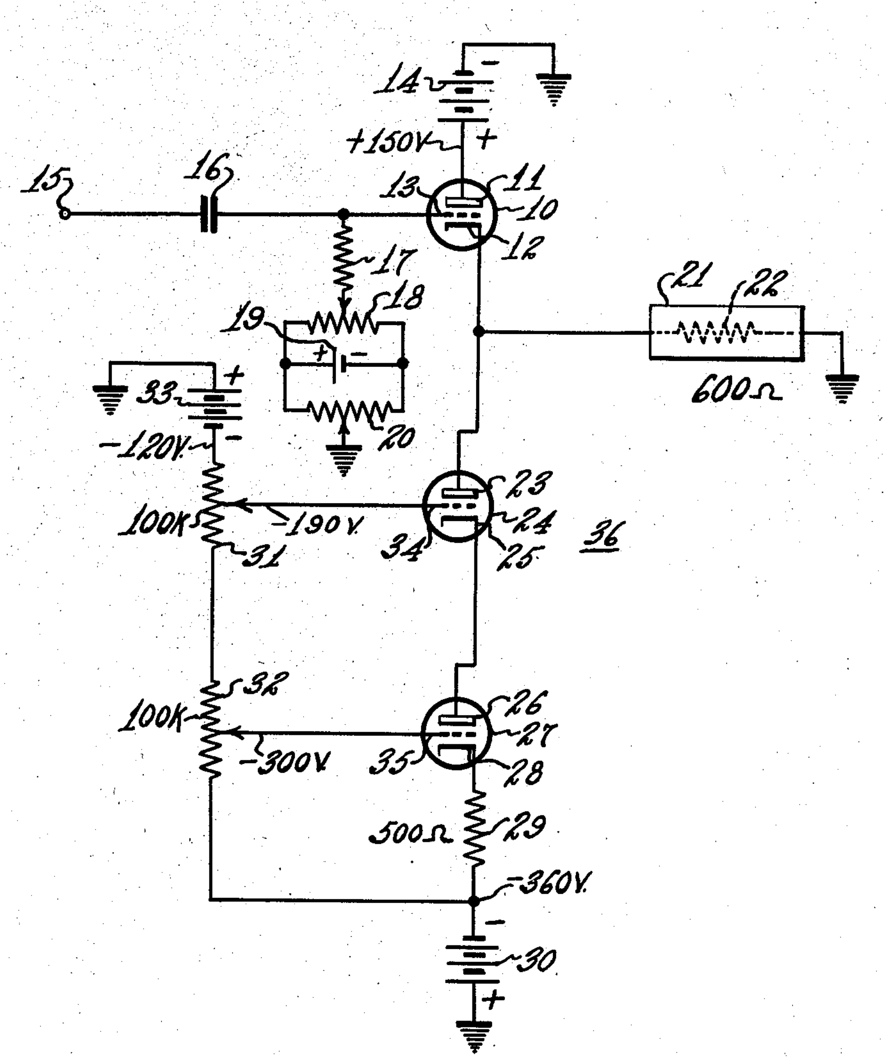
INVENTOR.
LOUIS SHAPIRO
BY Morris A. Rabkin
ATTORNEY United States Patent Office 2,845,574

Patented July 29, 1958

2,845,574

ADJUSTABLE LINEAR AMPLIFIER

Louis Shapiro, Haddonfield, N. J., assignor to Radio Corporation of America, a corporation of Delaware Application December 31, 1954, Serial No. 479,167

5 Claims. (Cl. 315—27)

This invention relates to an amplifier circuit employing cathode follower action for producing an output signal that is linearly related to the input signal.

It is often desirable to have an amplifier circuit which is highly linear and stable, and easy to adjust. For example, an amplifier of such high linearity, stability, and ease of adjustment is especially useful as the power amplifier in a cathode ray tube deflection circuit when exceptional linearity of deflection is desired.

Accordingly it is among the objects of this invention to provide:

A new and improved amplifier circuit that is highly linear;

An improved cathode follower amplifier that is highly stable;

An improved power amplifier circuit that is highly linear and easy to adjust.

In accordance with this invention an amplifier circuit includes a grid-controlled electron discharge tube. Connected to the tube cathode to be at the same potential as that cathode is a terminal of a load impedance and a terminal of a constant current source. A potential that is negative with respect to a reference potential is applied to another terminal of the current source. Another terminal of the load impedance is connected to the reference potential. Separate adjustable means are provided for applying a bias potential to the tube grid and for varying the amplitude of the current supplied by the source input signals. The tube acts as a cathode follower to the parallel loads of the load impedance and the constant current source. The load current is the difference between the cathode follower current and the constant current supplied by the source.

The foregoing and other objects, the advantages and novel features of this invention, as well as the invention itself both as to its organization and mode of operation, may be best understood from the following description when read in connection with the accompanying drawing, in which like reference numerals refer to like parts, and in which the sole figure is a schematic circuit diagram of an embodiment of this invention.

The amplifier circuit of the drawing includes a first electron discharge tube 10 having an anode 11, a cathode 12, and a control grid 13. The positive terminal of a source 14 of operating potential is connected to the anode 11 of the tube 10. Signal voltages received at an input terminal 15 may be applied to the grid 13 of the tube 10 through a coupling capacitor 16 or, in direct coupled system, by a voltage divider (not shown). A bias potential is applied to the grid 13 of the tube 10 through a grid resistor 17. The resistor 17 is connected to the adjustable tap of a potentiometer 18 that has a direct voltage source 19 connected across it. Another potentiometer 20 is connected across the bias voltage source 19, and its adjustable tap is connected to a reference potential shown by the conventional ground symbol.

The cathode 12 of the tube 10 is directly connected to one terminal of a load 21, the other terminal of which is connected to ground. The load 21 may be, for example, the deflection coil of a cathode ray tube (not shown). The effective impedance of the load 21 is shown as a resistor 22 in broken lines. The cathode 12 of the first tube 10 is also directly connected to the anode 23 of a second electron discharge tube 24. The cathode 25 of the second tube 24 is connected to the anode 26 of a third tube 27. The cathode 28 of the third tube 26 is connected through a resistor 29 to the negative terminal of a source 30 of direct voltage. The positive side of the voltage source 30 is connected to ground. A voltage divider that includes two adjustable resistors 31, 32 in series is connected between the negative terminal of the voltage source 30 and the negative terminal of another direct voltage source 33. The positive terminal of the voltage source 33 is connected to ground. The adjustable taps of the voltage divider resistors 31 and 32 are connected to the grids 34 and 35 of the second and third tubes 24 and 27, respectively.

The second and third tubes 24 and 27 operate as a constant current source 36 due to the constant voltages on the grids 34 and 35 and due to a high variational impedance which is approximately $(1+\mu)^2R_k$, where $\mu$ is the amplification factor of a tube, and $R_k$ is the resistance of the cathode resistor 29. The first tube 10 is connected as a cathode follower to the load impedance 22 and also to the parallel load presented by the constant current source 36. In addition to passing load current, the first tube passes all or part of the current supplied by the constant current source 36. Thus, the current in the load 22 is equal to the difference between the current through the first tube 10 and the current supplied by the constant current source 36. By adjustment of the biasing potentiometers 18 and 20 the current in the first tube 10 under conditions of no signal may be adjusted to any appropriate value. For example, the zero-signal current in the first tube 10 may be made equal to the current supplied by the constant current source 36 which is the condition for zero current in the load 22, and ground potential at the first tube cathode 12. In practice, the first tube 10 is operated over the linear portion of its characteristic.

A positive-going input signal excursion increases the current in the first tube 10 which appears as a voltage rise above ground at the cathode 12. Substantially all of the current increase in the first tube 10 flows through the load 22, because of the extreme constancy of the current supplied by the source 36 even with fairly large changes in voltage at the second tube anode 23.

A negative-going input signal excursion below the zero-signal grid voltage level reduces the current in the first tube 10 and reduces the voltage at the cathode to below ground potential. The return of the cathode resistor 29 to the negative potential of the source 30 permits a large negative voltage swing at the first tube cathode 12 as well as the positive voltage swing previously mentioned. Under the condition of a grid voltage below the zero-signal level, the current in the first tube 10 is less than the current supplied by the source 36. The difference appears as a negative current in the load impedance 22. In practice, the first tube 10 is operated over the linear portion of its characteristic. Therefore, the current supplied by the source 36 at the low end of the input signal excursion is made equal to the sum of the desired load current and the current through the tube 10 corresponding to the non-linear toe of the characteristic.

Thus, positive and negative signal excursions respectively result in positive and negative load currents. This symmetrical operation is obtained without push-pull matching. The relationship of load current to signal voltage is highly linear, because of the cathode follower action of the first tube 10 obtained by high grid-plate transconductance. Due to the constant current source 36, the circuit is highly stable.

The load current for no input signal may be adjusted to any appropriate value by means of the biasing potentiometers 18 and 20. Adjustment of the potentiometer 20 determines the level of the bias source 19 with respect to ground, and adjustment of the potentiometer 18 determines the grid bias voltage. Adjustment of the constant current source 36 is also simply performed. The adjustment of the first voltage divider resistor 31, which provides the grid voltage for the second tube 24 is not critical. The adjustment of the second voltage divider resistor 32 provides proper linearity at the low end of the signal excursion. The current source 36 may also be adjusted by means of an adjustable resistor (not shown) used in place of the fixed cathode resistor 29. Where the circuit is used to drive the deflection yoke of a cathode ray tube, the zero-signal load current is generally a substantial positive or negative current. The circuit of this invention may be quickly adjusted to provide a desired centered or other position of the cathode ray tube trace.

The specific circuit values shown in the drawing are illustrative and are not to be considered a limitation on the scope of the invention. The tube type employed is 5687 with four such double triodes connected in parallel as the first tube 10, and two each for the second and third tubes 24 and 27. For these component values, the variational impedance of the source is 200,000 ohms. The load current ranged from −120 to +120 milliamps.

Thus, by means of this invention a new and improved cathode follower amplifier circuit is provided. The circuit may be employed as a power amplifier and is highly linear and stable and easy to adjust.

What is claimed is:

1. An amplifier circuit for driving a deflection coil of a cathode ray tube, said circuit comprising a first grid-controlled electron discharge tube, a constant current source including a second and a third grid-controlled tube, and a resistor connected at one terminal to the cathode of said third tube, the cathode of said second tube being connected to the anode of said third tube, means for connecting the cathode of said first tube, the anode of said second tube, and a terminal of said deflection coil to be at the same potential, means for applying a reference potential to another terminal of said deflection coil, means for applying to another terminal of said resistor a potential negative with respect to said reference potential, adjustable voltage divider means for applying different bias potentials to the grids of said second and third tubes to vary the amplitude of current supplied by said constant current source, means for applying an operating potential to the anode of said first tube, adjustable means for applying a bias potential to the grid of said first tube to vary the current supplied by said first tube in the absence of input signals, and means for applying input voltages to said first tube grid.

2. An amplifier circuit for driving a deflection coil of a cathode ray tube, said circuit comprising a first grid-controlled electron discharge tube, a constant current source including a second and a third grid-controlled tube, and a resistor connected at one terminal to the cathode of said third tube, the cathode of said second tube being connected to the anode of said third tube, means for connecting the cathode of said first tube, the anode of said second tube, and a terminal of said deflection coil to be at the same potential, means for applying a reference potential to another terminal of said deflection coil, means for applying to another terminal of said resistor a potential negative with respect to said reference potential, adjustable voltage divider means for applying different bias potentials to the grids of said second and third tubes to vary the amplitude of current supplied by said constant current source, means for applying an operating potential to the anode of said first tube, adjustable means for applying a bias potential to the grid of said first tube to vary the current supplied by said first tube in the absence of input signals, and means for applying input voltages to said first tube grid, said adjustable voltage divider means including separate variable resistors for respectively varying the bias potentials applied to said second and third tube grids, and said adjustable bias potential applying means for said first tube including means for applying bias potentials that are positive and negative with respect to ground.

3. In combination with a deflection coil of a cathode ray tube, an amplifier circuit comprising three grid-controlled electron discharge tubes, means connecting the cathode of a first one of said tubes, the anode of a second one of said tubes, and a terminal of said deflection coil to be at the same potential, means for applying a reference potential to another terminal of said deflection coil, the cathode of said second tube being connected to the anode of a third one of said tubes, a resistor connected at one terminal to the cathode of said third tube, means for applying to another terminal of said resistor a potential negative with respect to said reference potential, means for applying deflection voltages to the grid of said first tube, and means for adjusting the current supplied by said tubes to said coil in the absence of deflection voltages to effect a reversal of current flow at a certain voltage in the range of said deflection voltages, said adjusting means including separate adjustable means for applying different bias potentials to the grids of said tubes.

4. In combination with a deflection coil of a cathode ray tube, an amplifier circuit comprising a first electron control device having anode, cathode, and control electrodes, a constant current circuit including a second and a third electron control device having anode, cathode, and control electrodes, means connecting the cathode electrode of said first device, the anode electrode of said second device, and a terminal of said deflection coil to be at the same potential, means connecting the cathode of said second device to the anode of said third device, means for applying a reference potential to another terminal of said deflection coil, means for supplying a fixed potential negative with respect to said reference potential, means coupling said negative fixed potential means to the cathode electrode of said third device, means for applying deflection signals having a certain range to the control electrode of said first device, and means for adjusting the currents supplied by said devices in the absence of said deflection signals to effect a reversal of current direction through said coil occurring at a certain intermediate signal value of said signal range, said adjusting means including separate adjustable means for applying different potentials to the control electrodes of each device.

5. In combination with a deflection coil of a cathode ray tube, an amplifier circuit comprising three grid-controlled electron discharge tubes, means connecting the cathode of a first one of said tubes, the anode of a second one of said tubes, and a terminal of said deflection coil to be at the same potential, means for applying a reference potential to another terminal of said deflection coil, the cathode of said second tube being connected to the anode of a third one of said tubes, means for applying to the cathode of said third tube a potential negative with respect to said reference potential, means for applying deflection voltages to the grid of said first tube, and means for adjusting the current supplied by said tubes to said coil in the absence of deflection voltages to effect a reversal of current flow at a certain voltage in the range of said deflection voltages, said adjusting means including separate adjustable means for applying different bias potentials to the grids of said tubes.

References Cited in the file of this patent

UNITED STATES PATENTS

| | | |
|---|---|---|
| 2,233,767 | Bouman | Mar. 4, 1941 |
| 2,237,420 | Ferris | Apr. 8, 1941 |
| 2,358,428 | White | Sept. 19, 1944 |
| 2,583,345 | Schade | Jan. 22, 1952 |
| 2,613,286 | Hare | Oct. 7, 1952 |
| 2,662,938 | Goldstine | Dec. 15, 1953 |